(12) United States Patent
Huang et al.

(10) Patent No.: US 8,904,868 B2
(45) Date of Patent: Dec. 9, 2014

(54) SENSING APPARATUS

(75) Inventors: Chih-Wei Huang, Taipei (TW); Chieh-Pin Chang, Taipei (TW); Ja-Hao Chen, Taipei (TW); Chuan-Jane Chao, Taipei (TW); Ying-Zong Juang, Taipei (TW); Shyh-Chyi Wong, Taipei (TW); Yeong-Her Wang, Taipei (TW)

(73) Assignee: RichWave Technology Corp., NeiHu District, Taipei (TW)

( * ) Notice: Subject to any disclaimer, the term of this patent is extended or adjusted under 35 U.S.C. 154(b) by 273 days.

(21) Appl. No.: 13/458,359

(22) Filed: Apr. 27, 2012

(65) Prior Publication Data
US 2012/0285245 A1 Nov. 15, 2012

(30) Foreign Application Priority Data

May 9, 2011 (TW) .............................. 100116107 A

(51) Int. Cl.
*G01P 15/125* (2006.01)
*G01P 15/08* (2006.01)

(52) U.S. Cl.
CPC ....... *G01P 15/125* (2013.01); *G01P 2015/0814* (2013.01)
USPC ..................................................... 73/514.32

(58) Field of Classification Search
CPC ...................... G01P 15/125; B81B 2201/0235
USPC ....................................................... 73/514.34
See application file for complete search history.

(56) References Cited

U.S. PATENT DOCUMENTS

| 6,257,061 | B1 * | 7/2001 | Nonoyama et al. | ......... 73/514.32 |
| 2002/0143484 | A1 * | 10/2002 | Chiesa | ............................. 702/94 |
| 2009/0139331 | A1 * | 6/2009 | Axelrod et al. | ............. 73/514.32 |
| 2011/0239784 | A1 * | 10/2011 | Ohsato | ..................... 73/862.044 |

* cited by examiner

*Primary Examiner* — Hezron E Williams
*Assistant Examiner* — Mark A Shabman
(74) *Attorney, Agent, or Firm* — Winston Hsu; Scott Margo

(57) ABSTRACT

A sensing apparatus includes an acceleration sensing unit, for measuring an acceleration applied to a proof mass, further including: a proof mass; a carrier signal source, for providing a carrier signal; a capacitive half-bridge, including a first and a second capacitor, wherein each capacitor is coupled to the proof mass and the carrier signal source, one with a positive electrode and the other one with a negative electrode, and the acceleration applied to the proof mass makes the carrier signal flow through the first and the second capacitor so that the first capacitor and the second capacitor respectively generates a first voltage and a second voltage variation which have opposite phases with each other; and an instrumentation amplifier, for receiving and amplifying the first voltage and the second voltage variation, whereby the magnitude and the direction of the acceleration applied to the proof mass is determined.

9 Claims, 3 Drawing Sheets

US 8,904,868 B2

SENSING APPARATUS

CROSS REFERENCE TO RELATED APPLICATIONS

This Non-provisional application claims priority under 35 U.S.C. §119(a) on Patent Application No(s). 100116107, filed in Taiwan, Republic of China on May, 9, 2011, the entire contents of which are hereby incorporated by reference.

BACKGROUND OF THE INVENTION

1. Field of the Invention

The present invention relates to a sensing apparatus, and in particular relates to sensing acceleration for a micro-electromechanical system (MEMS).

2. Description of the Related Art

FIG. 1 shows a displacement accelerometer 100, which is usually used in the micro-electromechanical system (MEMS) in the prior art. As shown in FIG. 1, in this displacement accelerometer 100, a standard proof mass 110 is suspended on a base (not shown) by a spring 120. The displacement accelerometer 100 is used to measure the displacement of the standard proof mass 110 along an X direction due to an acceleration applied thereto.

However, for the prior art, it is difficult to integrate the readout circuit of the accelerometer to that of the other sensors such as a temperature sensor or pressure sensor in order reduce their size in a chip of the MEMS.

Therefore, a new sensing apparatus which can be used as an accelerometer and other kinds of sensors in the MEMS and has a small size is needed.

BRIEF SUMMARY OF THE INVENTION

The present invention provides a sensing apparatus, which comprises: an acceleration sensing unit, for measuring an acceleration applied to a proof mass, further comprising: a proof mass; a carrier signal source, for providing a carrier signal; a capacitive half-bridge, comprising a first capacitor and a second capacitor, wherein each of the first capacitor and the second capacitor is coupled to the proof mass and the carrier signal source, one with a positive electrode and the other one with a negative electrode, and the acceleration applied to the proof mass makes the carrier signal flowing through the first capacitor and the second capacitor so that the first capacitor and the second capacitor respectively generates a first voltage variation and a second voltage variation which have opposite phases with each other; and an instrumentation amplifier, for receiving and amplifying the first voltage variation and the second voltage variation, whereby the magnitude and the direction of the acceleration applied to the proof mass is determined.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
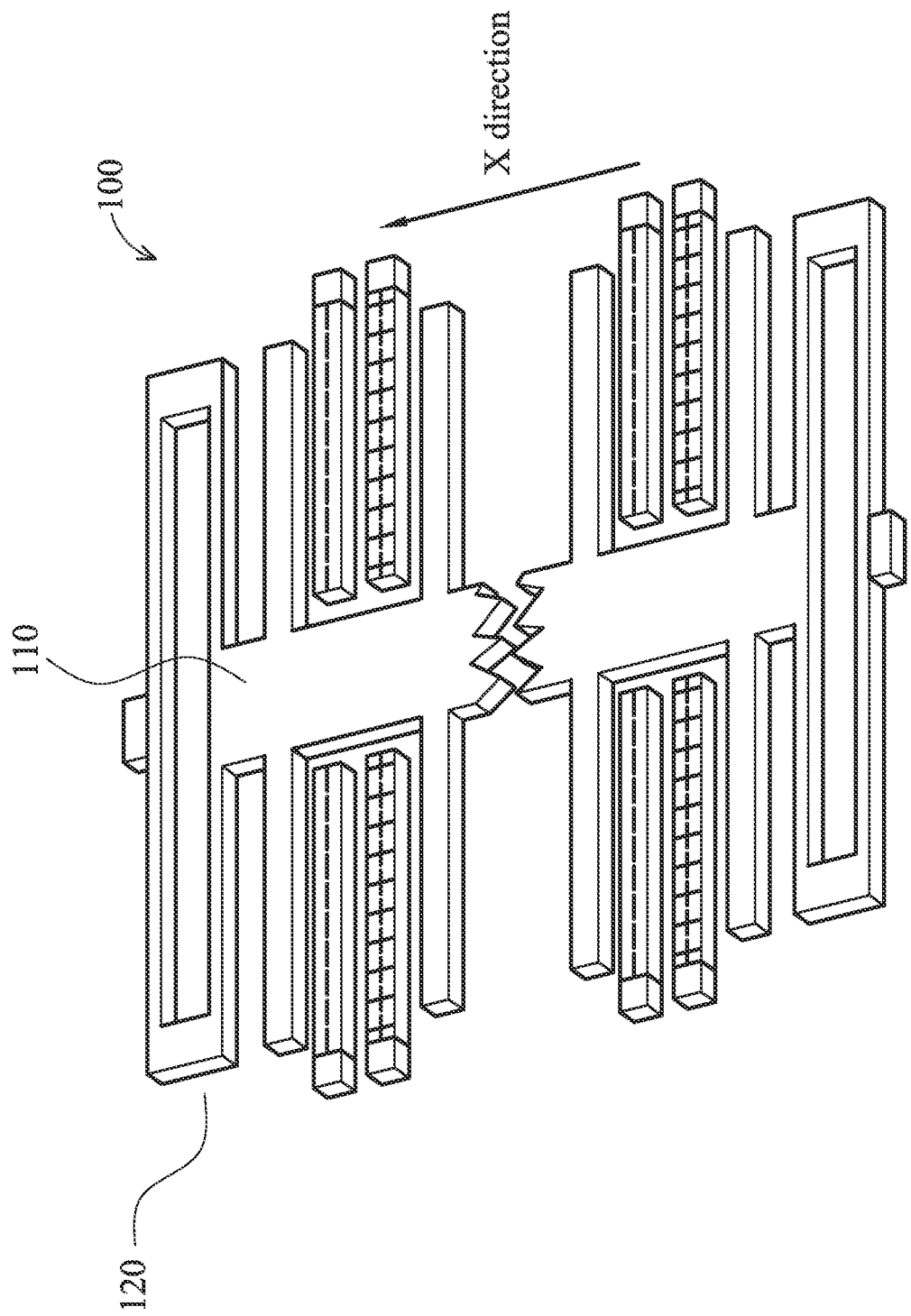
FIG. 1 shows a displacement accelerometer 100, which is usually used in the micro-electromechanical system (MEMS) in the prior art.
Figure 2:
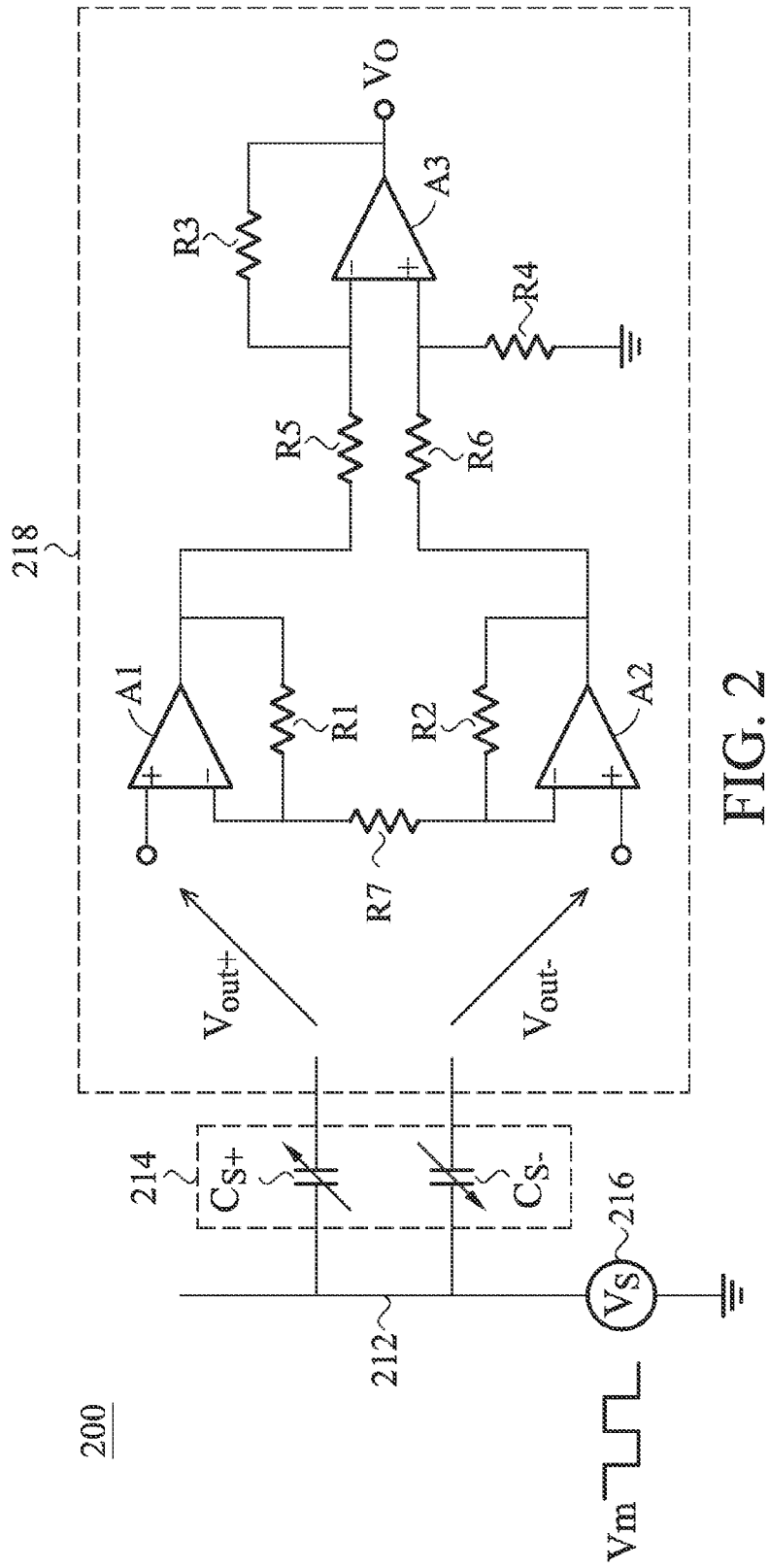
FIG. 2 is a schematic diagram of the sensing apparatus 200 according to an embodiment of the present invention.

FIG. 2 is a schematic diagram of the sensing apparatus 200 according to an embodiment of the present invention. The sensing apparatus 200 of the present invention is provided to be used in the micro-electromechanical system (MEMS) mainly for measuring acceleration. Thus, the sensing apparatus 200 includes a proof mass 212 as shown in FIG. 1. When a force along the X direction is applied to the proof mass 212, acceleration is produced to move the proof mass 212.

Note that the capacitive acceleration sensing unit 214 of the present invention is a capacitive interface for measuring the displacement of the proof mass 212, and is coupled to the proof mass 212 and a readout circuit which will be discussed below. The purpose of using the capacitive acceleration sensing unit 214 can be regarded as being equal to a capacitive half-bridge. As shown in FIG. 2, the capacitive half-bridge is composed of a first capacitor CS+ and a second capacitor CS−.

The carrier signal source 216 in FIG. 2 is used for providing a carrier signal. In this embodiment, the carrier signal is a voltage signal having an amplitude of Vm and a frequency f. The first capacitor CS+ and the second capacitor CS− are respectively coupled to the proof mass 212 and the carrier signal source 216 with opposite electrodes as shown in FIG. 2. In a preferred embodiment, the first capacitor CS+ and the second capacitor CS− match with each other, thus, they have the same capacitance. In this embodiment, when the produced acceleration causes the proof mass 212 to be displaced, it also causes the capacitance of the first capacitor CS+ and the second capacitor CS− to vary in an opposite manner. Specifically, one of the capacitance of the first capacitor CS+ and the second capacitor CS− may gain $\Delta CS/2$, and the other may lose $\Delta CS/2$. At the same time, the carrier signal flows through the first capacitor CS+ and the second capacitor CS−, and respectively produces a first voltage variation Vout+ and a second voltage variation Vout− thereon. For example, if the readout circuit coupled to the output of the capacitive acceleration sensing unit 214 has an input capacitance Ci, and the parasitic capacitance of the acceleration sensing unit 214 and the readout circuit is far higher than the said capacitances so as to be ignored, the first voltage variation Vout+ can be expressed as $+\Delta Vm \times \Delta CS/2\Delta Ci$, and the second voltage variation Vout− can be expressed as $-\Delta Vm \times \Delta CS/2\Delta Ci$.

In the present invention, the readout circuit coupled to the capacitive acceleration sensing unit 214 is an instrumentation amplifier 218. The instrumentation amplifier 218 is used for receiving and amplifying the first voltage variation Vout+ and the second voltage variation Vout−, whereby the magnitude and the direction of the acceleration applied to the proof mass 212 is determined. The instrumentation amplifier of the present invention comprises a first operational amplifier A1, a second operational amplifier A2, a third operational amplifier A3, a first resistor R1, a second resistor R2, a third resistor R3, a fourth resistor R4, a fifth resistor R5, a sixth resistor R6, a seventh resistor R7. The first operational amplifier A1 comprises a first positive input, a first negative input, and a first output, wherein the first positive input is used for receiving the first voltage variation Vout+. The second operational amplifier A2 comprises a second positive input, a second negative input, and a second output, wherein the second positive input is used for receiving the second voltage variation Vout−. The third operational amplifier A3 comprises a third positive input, a third negative input, and a third output. The first resistor R1 is coupled between the first negative input and the first output. The second resistor R2 is coupled between the second negative input and the second output. The third resistor R3 is coupled between the third negative input and the third output. The fourth resistor R4 is coupled between the third positive input and a ground. The fifth resistor R5 is coupled between the first output and the third negative input. The sixth resistor R6 is coupled between the second output and the third positive input. The seventh resistor R7 is coupled between the first negative input and the second negative input. In this embodiment, the first resistor R1 and the second resistor R2 have to match with each other (for example, having the same resistance Rf); the third resistor R3 and the fourth resistor R4 have to match with each other (for example, having the same resistance Ry); and the fifth resistor R5 and the sixth resistor R6 have to match with each other (for example, having the same resistance). When the seventh resistor has resistance Rg, the output of the instrumentation amplifier output in this embodiment can be expressed as follows:

$$Vo = \left(1 + \frac{2Rf}{Rg}\right)\frac{Ry}{Rx}(V_{out+} - V_{out-})$$

In another embodiment, the fourth resistor R4 (not shown) can be removed from the instrumentation amplifier for power saving, and the output of the instrumentation amplifier can be expressed as follows:

$$Vo = \left(1 + \frac{2Rf}{Rg}\right)\frac{Ry}{Rx}(V_{out+} - V_{out-}) + V_{out-}$$

With the instrumentation amplifier, the magnitude and the direction of the acceleration applied to the proof mass 212 can be easily determined.

In the prior art, the instrumentation amplifier can not be used with the accelerometer. However, the present invention uses the capacitive acceleration sensing unit 214 as the interface between the proof mass 212 and the instrumentation amplifier 218, thus overcoming the limitations in the prior art. In addition, the instrumentation amplifier has few noises, and is very suitable to be a readout circuit for various sensors. The fourth resistor R4 can be removed from the sensing apparatus 200 of the present invention to measure other sensing signals. For example, in an embodiment, the instrumentation amplifier 218, without the fourth resistor, can be integrated with a temperature sensing unit (not shown) to measure the temperature variation, integrated with a pressure sensing unit (not shown) to measure the pressure variation, or integrated with an infrared sensing unit (not shown) to detect infrared signal. The capacitive acceleration sensing unit 214 can share the instrumentation amplifier with the temperature sensing unit, pressure sensing unit, infrared sensing unit, or other sensors by using various switches in order to reduce the size of the MEMS. These sensing units are described for illustration purpose only, and those skilled in the art can select and integrate proper sensing units with the acceleration sensing unit o14 according to the spirit of the present invention.

Figure 3:
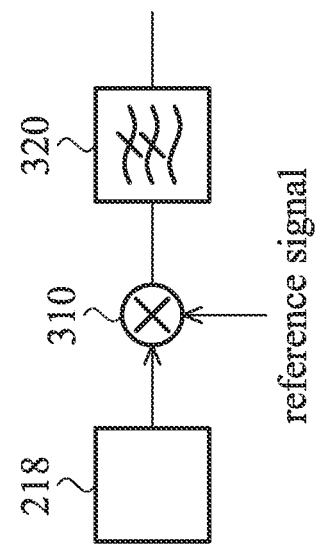
FIG. 3 shows a mixer and a low pass filter of the present invention.

In order to further lower noise in and increase the sensitivity of the sensing apparatus 200, the present invention, in an embodiment, can further comprise a mixer and a low pass filter, as shown in FIG. 3. In this embodiment, the mixer 310 is coupled to the output of the instrumentation amplifier 218, and the low pass filter 320 is coupled to the output of the mixer 310. For example, if the frequency of the output of the instrumentation amplifier 218 is about 500 kHz, and that of the background noise is about 10 kHz, the mixer 310 may additionally mix a reference signal of 499 kHz into itself, and the reference signal of 499 kHz will be subtracted from the output signal of 500 kHz and the background noises of 10 kHz to produce a mixed output signal of 1 kHz and a mixed background noise of 489 kHz. At last, the low pass filter 320 may hold the low-frequency output signal (1 kHz) output and filter out the high-frequency background signal (489 kHz). The said mixer 310 and the low pass filter 320 are described for illustration purpose only, and those skilled in the art can replace them with various electronic components to achieve the same purpose.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A sensing apparatus, comprising:
an acceleration sensing unit, for measuring an acceleration applied to a proof mass, further comprising:
the proof mass;
a carrier signal source, for providing a carrier signal flowing through a first capacitor and a second capacitor;
a capacitive half-bridge, comprising the first capacitor and the second capacitor, wherein each of the first capacitor and the second capacitor is coupled to the proof mass and the carrier signal source, one with a positive electrode and the other one with a negative electrode, and, wherein when the acceleration applied to the proof mass, a first voltage variation and a second voltage variation having opposite phases with each other are generated on the first capacitor and the second capacitor due to a displacement of the proof mass; and
an instrumentation amplifier, for receiving and amplifying the first voltage variation and the second voltage variation, whereby a magnitude and a direction of the acceleration applied to the proof mass is determined, wherein the instrumentation amplifier comprises:
a first operational amplifier, further comprising:
a first positive input, for receiving the first voltage variation;
a first negative input; and
a first output;
a second operational amplifier, further comprising:
a second positive input, for receiving the second voltage variation;
a second negative input; and
a second output;
a third operational amplifier, further comprising:
a third positive input;
a third negative input; and
a third output;
a first resistor, coupled between the first negative input and the first output;

a second resistor, coupled between the second negative input and the second output;
a third resistor, coupled between the third negative input and the third output;
a fifth resistor, coupled between the first output and the third negative input;
a sixth resistor, coupled between the second output and the third positive input; and
a seventh resistor, coupled between the first negative input and the second negative input.

2. The sensing apparatus as claimed in claim 1, wherein the first capacitor and the second capacitor have equal capacitance when the acceleration is not applied to the proof mass.

3. The sensing apparatus as claimed in claim 1, wherein the instrumentation amplifier comprises:
a fourth resistor, coupled between the third positive input and the ground.

4. The sensing apparatus as claimed in claim 3, wherein the first resistor and the second resistor have equal resistance, the third resistor and the fourth resistor have equal resistance, and the fifth resistor and the sixth resistor have equal resistance.

5. The sensing apparatus as claimed in claim 1, wherein the first resistor and the second resistor have equal resistance; and the fifth resistor and the sixth resistor have equal resistance.

6. The sensing apparatus as claimed in claim 1, further comprising a mixer and a low pass filter, for filtering out a noise within the sensing apparatus, wherein the mixer is coupled to an output of the instrumentation amplifier, and the low pass filter is coupled to an output of the mixer.

7. The sensing apparatus as claimed in claim 1, wherein the sensing apparatus further comprises a temperature sensing unit for measuring a temperature variation, wherein the temperature sensing unit shares the instrumentation amplifier with the acceleration sensing unit by using switches.

8. The sensing apparatus as claimed in claim 1, wherein the sensing apparatus further comprises a pressure sensing unit for measuring pressure variations, wherein the pressure sensing unit shares the instrumentation amplifier with the acceleration sensing unit by using switches.

9. The sensing apparatus as claimed in claim 1, wherein the sensing apparatus further comprises an infrared sensing unit for sensing infrared light, wherein the infrared sensing unit shares the instrumentation amplifier with the acceleration sensing unit by using switches.

* * * * *